UNITED STATES PATENT OFFICE.

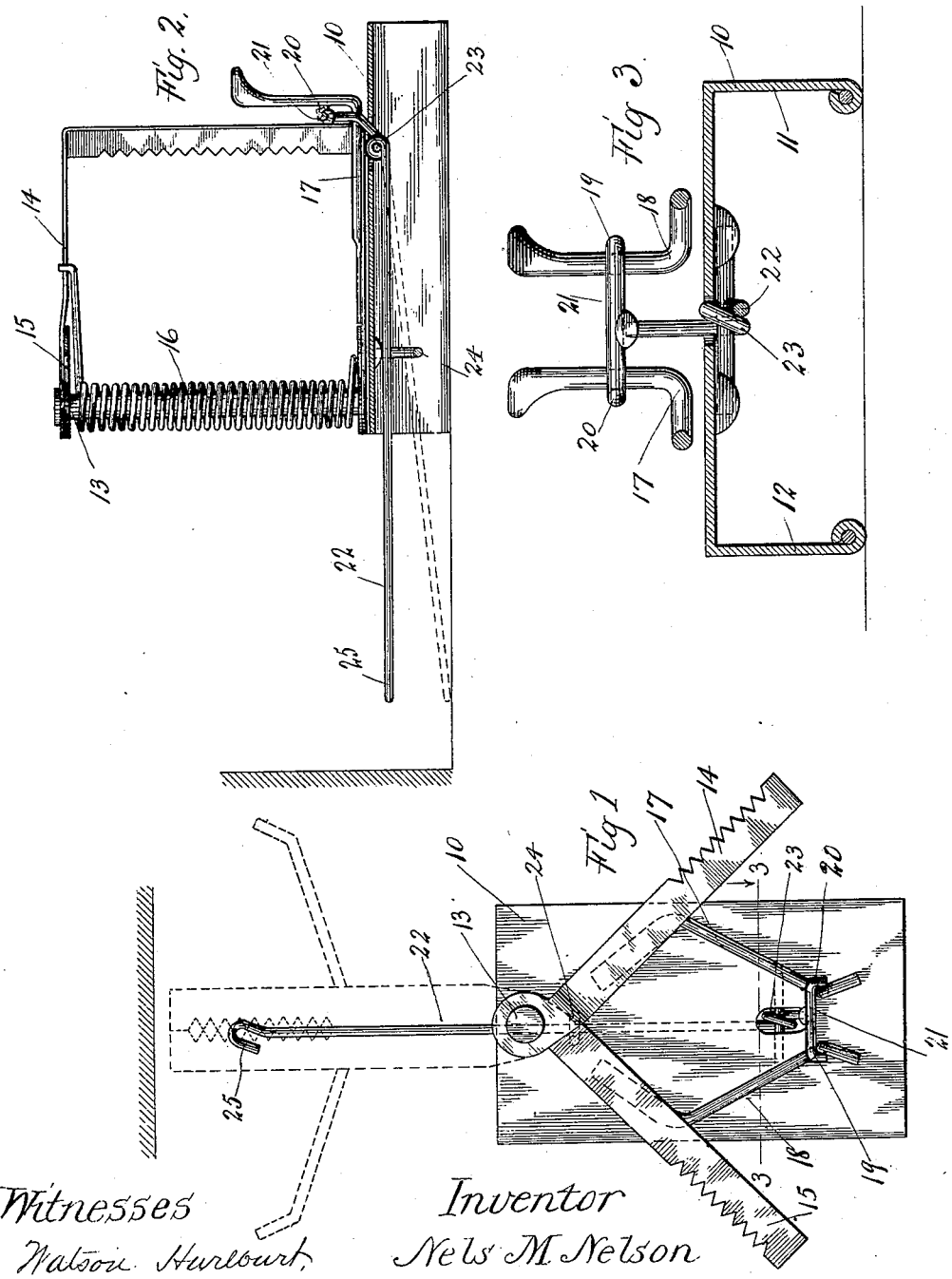

NELS M. NELSON, OF DEERFIELD, WISCONSIN.

ANIMAL-TRAP.

SPECIFICATION forming part of Letters Patent No. 665,692, dated January 8, 1901.

Application filed September 28, 1900. Serial No. 31,435. (No model.)

*To all whom it may concern:*

Be it known that I, NELS M. NELSON, a citizen of the United States, and a resident of Deerfield, in the county of Dane and State of Wisconsin, have invented certain new and useful Improvements in Animal-Traps, of which the following is a specification and which are fully illustrated in the accompanying drawings, forming a part thereof.
This invention relates particularly to traps intended to catch rats and mice and to that type known as "jaw-traps."

The objects of the invention are to provide a simple and inexpensive form of trap and one which is particularly adapted to be placed adjacent to a wall, so that its trip-bar will cross the path in which the animal is accustomed to run and that it may be tripped even though the animal is not enticed by the bait.
The invention consists in the structure hereinafter fully described and which is illustrated in the accompanying drawings, in which—

Figure 1 is a plan view of the trap. Fig. 2 is a side elevation of the same, and Fig. 3 is a transverse section on the line 3 3 of Fig. 1 looking in the direction of the arrow.

The base or standard of the trap may be a simple piece of sheet metal, as shown at 10, bent downwardly at its side edges to form the legs 11 and 12, which may rest upon the floor. From the front end of this base there rises a vertical post 13, upon which are pivoted a pair of jaws 14 15, controlled by a spring 16, coiled about the post and tending normally to close the jaws forward of the standard. Each of the jaws is provided with a backwardly-extending controlling-handle 17 and 18, by means of which the jaws may be opened and which are adapted to engage the detents 19 and 20 for the purpose of setting the trap. These detents are the ends of a U-shaped wire 21, attached to the end of the trip-bar 22, projecting upwardly through suitable apertures in the plate 10, the trip-bar 22 being pivoted, as shown at 23, below the table of the standard. A guide-loop 24 near the forward end of the plate 10 prevents lateral movement of the bar 22. The trap having been set by opening the jaws and engaging their handpieces with the detents 19 20, it is placed near a wall and with its forward end adjacent thereto, so that the bar 22 reaches almost to the wall, a bait being applied to the hook 25, or not, as may be desired.

It is well known that rats and mice have a habit of moving along by the walls of a room, so that if such vermin are present in the room they are almost certain to cross the bar 22 as they move about. A bait may be placed upon the bar for the purpose of enticing them; but whether a bait is or is not used the animal in approaching or passing the trap will force down the bar, and thus disengage the detents from the handpieces of the jaws, and the latter will be violently closed by the action of the spring 16, seizing the body of the animal between them.

I claim as my invention—

In an animal-trap, in combination, a base, a fixed post rising from one end of the base, a pair of jaws pivoted upon the post and extending beyond the base when closed, a spring coiled about the post for closing the jaws, arms projecting from the rearward side of the jaws for manually controlling the same, a trip-bar pivotally mounted below the base and extending beyond the same in line with the jaws when in their closed position, detents secured to the trip-bar for engaging the arms when the jaws are open, substantially as described.

NELS M. NELSON.

Witnesses:
NELS HOLMAN,
OLE O. ANDERSON.